United States Patent [19]

Martens

[11] Patent Number: 4,836,831

[45] Date of Patent: Jun. 6, 1989

[54] PROCESS FOR PARTIAL OXIDATION OF A HYDROCARBON-CONTAINING FUEL

[75] Inventor: Franciscus J. A. Martens, Amsterdam, Netherlands

[73] Assignee: Shell Oil Company, Houston, Tex.

[21] Appl. No.: 184,643

[22] Filed: Apr. 22, 1988

[30] Foreign Application Priority Data

May 12, 1987 [GB] United Kingdom ............... 871156

[51] Int. Cl.$^4$ .............................................. C01B 3/36
[52] U.S. Cl. .............................. 48/197 R; 48/196 R; 252/373
[58] Field of Search ................ 48/196 R, 197 R, 206, 48/215; 252/373

[56] References Cited

U.S. PATENT DOCUMENTS

| | | | |
|---|---|---|---|
| 2,713,894 | 7/1955 | Sage | 48/196 R |
| 2,725,933 | 12/1955 | Gauder | 48/196 R |
| 2,752,232 | 6/1956 | Arnold | 48/196 R |
| 2,767,785 | 10/1956 | Eastman et al. | 48/196 R |
| 3,048,476 | 8/1962 | Dwyer | 252/373 |
| 3,945,942 | 3/1976 | Marion et al. | 48/196 R |
| 4,443,230 | 4/1984 | Stelloccis | 252/373 |
| 4,455,949 | 6/1984 | Kretschmer et al. | 110/263 |
| 4,491,456 | 1/1985 | Schlinger | 48/206 |
| 4,699,631 | 10/1987 | Marion | 48/197 R |

*Primary Examiner*—Peter Kratz
*Attorney, Agent, or Firm*—Ronald R. Reper

[57] ABSTRACT

Process for the partial oxidation of fuel using a multi-orifice burner comprising a central channel and three substantially concentric channels encircling the central channel. Fuel is supplied through each of the first and third concentric channels and the oxidizer is supplied through each of the central channel and the second concentric channel. The reactant fuel and oxidizer are supplied at specific mass flow distribution and velocities.

9 Claims, No Drawings

PROCESS FOR PARTIAL OXIDATION OF A HYDROCARBON-CONTAINING FUEL

BACKGROUND OF THE INVENTION

The invention relates to a process for partial oxidation of a hydrocarbon-containing fuel using a multi-orifice burner.

In particular, the invention relates to a process for partial oxidation of a hydrocarbon-containing fuel wherein an oxygen-containing gas and a hydrocarbon-containing fuel are supplied to a gasification zone through a multi-orifice burner comprising a concentric arrangement of two oxygen passages or channels and two fuel passages or channels, and wherein autothermically a gaseous stream containing synthesis gas (syngas) is produced under appropriate conditions.

The oxygen-containing gas is usually air or pure oxygen or a mixture thereof. In order to control the temperature in the gasification zone a moderator gas can be supplied to said zone.

More particularly, the invention relates to a process as described in the foregoing, wherein a gas, for example natural gas, refinery gas, methane and the like is suitable as a fuel.

In such processes it is necessary to ensure a good and rapid contacting or mixing of the fuel and the oxygen-containing gas in order to obtain an excellent gasification process.

Further, in such process the lifetime of the equipment can be lengthened by the reduction of the convective and radiative heat-flux via flame-lift without distorting the process performance.

It is an object of the invention to provide a process for partial oxidation of a hydrocarbon-containing fuel wherein a rapid and intimate mixing of the reactants outside the concentric arrangement is obtained. It is another object of the invention to provide a process for partial oxidation of a hydrocarbon-containing fuel wherein the mixing energy of oxygen and fuel is provided by the high velocity fuel flow.

It is another object of the invention to provide a process for partial oxidation of a hydrocarbon-containing fuel wherein pressure losses are minimized and wherein shorter reactor lengths are made possible, since the effective reactor residence time is maintained via the reduction of the effective burner velocity and the mixing distance downstream the burnerface.

It is still another object of the invention to provide a process for partial oxidation of a hydrocarbon-containing fuel wherein highly exothermic reactions are prevented in the region where the relatively hot syngas from the reactor mixes with the reactants from the third concentric channel.

SUMMARY OF THE INVENTION

The invention therefore provides a process for partial oxidation of a hydrocarbon-containing fuel comprising the steps of supplying an oxygen-containing gas and hydrocarbon-containing fuel to a gasification zone through a multi-orifice burner comprising a concentric arrangement of 2 oxygen passages or channels and 2 fuel passages or channels, and producing auto-thermically a gaseous stream containing synthesis gas under appropriate conditions, and further comprising the steps of supplying the oxygen-containing gas through the central channel of the concentric arrangement at a relatively low velocity of 5–45 m/sec; supplying hydrocarbon-containing fuel through the first concentric channel encircling the central channel at a relatively high velocity of 50–150 m/sec; supplying oxygen-containing gas through the second concentric channel encircling said first channel at a relatively low velocity of 5–45 m/sec; and supplying at least one material selected from hydrocarbon-containing fuel and a moderator gas through the third concentric channel encircling the second concentric channel at a relatively low velocity of 5–45 m/sec.

DESCRIPTION OF PREFERRED EMBODIMENTS

In advantageous embodiments of the invention 30 to 45 mass per cent of the oxygen-containing gas (per cent of the total mass of the supplied oxygen-containing gas) is supplied through the said central channel and 10 to 20 mass per cent of the fuel is supplied through the third concentric channel.

In another advantageous embodiment of the invention the respective velocities are measured at the outlet of the said respective channels into the gasification zone. The velocity measurement can be carried out in any way suitable for the purpose and will not be described in detail.

In still another advantageous embodiment of the invention the oxygen-containing gas and/or the fuel contain steam or carbon dioxide as a moderator. In yet another advantageous embodiment of the invention the gasification process is carried out at a pressure in the range of from about 0.1 to about 12 MPa, particularly from about 2 to about 8 MPa. Exemplary temperatures are in the range from about 1275° K. to 1875° K., particularly from about 1500° K. to 1800° K.

In still another advantageous embodiment of the invention the hydrocarbon containing fuel is a gas, for example methane, natural gas or refinery gas.

The fuel and the oxygen-containing gas are supplied to the gasification zone through a concentric arrangement of two oxygen passages and two fuel passages. A central channel for oxygen (advantageously mixed with a moderator) supply is surrounded by a first annular channel for fuel supply. The said first annular channel is surrounded by a second annular channel for oxygen (advantageously mixed with a moderator) supply and the said second channel is surrounded by a third annular channel for fuel and/or moderator supply.

Multi-orifice burners comprising arrangements of annular concentric channels for supplying oxygen and fuel to gasification zones are known in the art and the mechanical details thereof will not be described.

According to the invention the oxygen and the fuel are supplied to the gasification zone through the respective channels at specific low velocities and specific mass distribution in order to obtain low pressure loss, rapid and intimate mixing of reactants, effective long reactor residence time and flame lift.

The syngas product will comprise substantially carbon monoxide and hydrogen with minor amounts of carbon dioxide (on a dry basis).

The invention will now be described in more detail by reference to the following illustrative embodiments under the following conditions:

|  | Example I | Example II |
| --- | --- | --- |
| (a) fuel | | |

|  | Example I | Example II |
|---|---|---|
| mass flow (kg/s) | 3.172 | 4.446 |
| density (kg/m$^3$) | 14.0 | 16.3 |
| temperature (K.) | 673 | 672 |
| composition vol. % | | |
| CO | 7.374 | 0.336 |
| CO$_2$ | 15.57 | 3.798 |
| CH$_4$ | 68.57 | 84.05 |
| other hydrocarbons | 1.702 | 7.832 |
| H$_2$ | 6.474 | 3.286 |
| N$_2$ | 0.310 | 0.698 |
| (b) oxidizer | | |
| mass flow oxygen (kg/s) | 2.703 | 4.954 |
| mass flow steam (kg/s) | 0.3808 | 0.2207 |
| density (kg/m$^3$) | 25.7 | 34.2 |
| temperature (K.) | 519 | 534 |
| composition vol. % | | |
| H$_2$O | 20.03 | 7.334 |
| N$_2$ | 0.12 | 0.4633 |
| O$_2$ | 79.85 | 92.203 |
| (c) Production: | | |
| CO + H$_2$ (nm$^3$/day dry) × 10$^3$ | 600 | 1275 |
| (d) Geometry at burner face: | | |
| diameter central channel (mm) | 55.28 | 64.00 |
| slot width first concentric channel (mm) | 13.88 | 11.50 |
| slot width second concentric channel (mm) | 12.03 | 13.72 |
| slot width third concentric channel (mm) | 6.34 | 7.14 |
| mixing distance downstream of burnerface for macro mix of reactants (m) | 0.15 | 0.11 |
| (e) Distribution of mass flow and velocity | | |
| mass ratio (%) | | |
| central channel (oxidizer) | 40 | 40 |
| first concentric channel (fuel) | 80 | 80 |
| second concentric channel (oxidizer) | 60 | 60 |
| third concentric channel (fuel) | 20 | 20 |
| Velocity at burner face | | |
| oxidizer via central channel (m/s) | 20 | 20 |
| fuel via first concentric channel (m/s) | 60 | 80 |
| oxidizer via second concentric channel (m/s) | 20 | 20 |
| fuel via third concentric channel (m/s) | 20 | 20 |
| (f) reactor | | |
| pressure (MPa) | 3.8 | 4.9 |
| temperature (K.) | 1675 | 1600 |
| (g) Typical raw syngas composition % vol dry | | |
| CO | 40.4 | 35.6 |
| CO$_2$ | 5.2 | 2.0 |
| H$_2$ | 54.3 | 61.0 |
| CH$_4$ | 0.1 | 1.4 |

Various modifications of the present invention will become apparent to those skilled in the art from the foregoing description. Such modifications are intended to fall within the scope of the appended claims.

What is claimed is:

1. A process for partial oxidation of a hydrocarbon-containing gaseous fuel comprising the steps of supplying an oxygen-containing gas and a hydrocarbon-containing fuel gas to a gasification zone through a multi-orifice burner comprising a concentric arrangement of two oxygen channels and two fuel channels, and producing auto-thermically a gaseous stream containing synthesis gas under appropriate conditions, and further comprising the steps of supplying oxygen-containing gas through the central channel of the concentric burner arrangement at a relatively low velocity of 5–45 m/sec; supplying hydrocarbon-containing fuel through the first concentric channel encircling said central channel and at a relatively high velocity of 50–150 m/sec; supplying oxygen-containing gas through the second concentric channel encircling said first concentric channel and at a relatively low velocity of 5–45 m/sec; and supplying a material selected from hydrocarbon-containing fuel and a moderator through a third concentric channel encircling the second concentric channel, and at a relatively low velocity of 5–45 m/sec.

2. The process as claimed in claim 1 wherein said hydrocarbon-containing fuel gas is natural gas or refinery gas.

3. The process as in claim 2 wherein said fuel gas is at least 65 per cent by volume methane.

4. The process as in claim 1 wherein at least one of the oxygen-containing gases and the fuel gas is supplied with up to 25 per cent volume of a moderator gas.

5. The process as in claim 4 wherein the moderator is selected from the group consisting of steam and carbon dioxide.

6. The process as in claim 1 wherein the process is carried out at a pressure in the range from about 0.1 to about 12 MPa.

7. The process as in claim 6 wherein the process is carried out at a pressure for about 2 to about 8 MPa.

8. The process as in claim 1 wherein 30–45 mass per cent of the oxygen-containing gas is supplied through said central channel.

9. The process as in claim 1 wherein 10–20 mass per cent of the fuel is supplied through said third concentric channel.

* * * * *